United States Patent [19]

Wuertz

[11] Patent Number: 5,410,103
[45] Date of Patent: Apr. 25, 1995

[54] SELF-ANCHORING POKE-THROUGH WIRING DEVICE

[75] Inventor: Emil S. Wuertz, Madison, Conn.

[73] Assignee: Hubbell Incorporated, Orange, Conn.

[21] Appl. No.: 61,616

[22] Filed: May 13, 1993

Related U.S. Application Data

[63] Continuation-in-part of Ser. No. 712,515, Jun. 10, 1991, abandoned.

[51] Int. Cl.⁶ .............................................. H02G 3/04
[52] U.S. Cl. ...................................... 174/48; 52/220.8
[58] Field of Search .................... 174/48, 49; 52/220.8; 169/48

[56] References Cited

U.S. PATENT DOCUMENTS

| | | | |
|---|---|---|---|
| 4,323,724 | 4/1982 | Shine | 174/48 |
| 4,477,694 | 10/1984 | Kohaut | 174/48 |
| 4,496,790 | 1/1985 | Spencer | 174/48 |
| 4,572,923 | 2/1986 | Castellani et al. | 174/48 |
| 4,827,080 | 5/1989 | Castellani et al. | 174/48 |

Primary Examiner—Leo P. Picard
Assistant Examiner—David Tone
Attorney, Agent, or Firm—Leopold Presser; Jerry M. Presson

[57] ABSTRACT

A poke-through wiring device and, more particularly, a self-anchoring poke-through wiring device which is positioned in a floor aperture of a concrete building floor for conducting electrical power and telecommunication signals between the work spaces of multi-storied building. The device incorporates anchoring clips in the shape of flat, essentially rectangular or polygonal non-resilient metal plates which are securely fastened by means of screw fasteners in surface contact with at least one plate of a sandwich-type fire retardant disc structure, and with the clips projecting radially outwardly thereof so as to have the outer edge or at least the corner of each anchoring clip severely bent and permanently deformed upon insertion of the wiring device into the floor aperture, thereby firmly contacting and grippingly engaging into the concrete wall surface of the perimeter of a floor aperture, and causing the entire poke-through wiring device or fitting to be firmly anchored in the aperture in a predetermined angular orientation relative to the aperture axis as required by the specific installation.

7 Claims, 2 Drawing Sheets

SELF-ANCHORING POKE-THROUGH WIRING DEVICE

CROSS-REFERENCE TO RELATED PATENT APPLICATIONS

The present application is a continuation-in-part patent application of Ser. No. 07/712,515; filed on Jun. 10, 1991, now abandoned.

BACKGROUND OF THE INVENTION

1. Field of the Invention

The present invention relates to a poke-through wiring device and, more particularly, relates to a self-anchoring poke-through wiring device which is positioned in a floor aperture of a concrete building floor for conducting electrical power and telecommunication signals between the work spaces of multi-storied buildings.

During the erection of building structures of various types; for instance, such as modern multi-storied office buildings possessing concrete floors, it is frequently necessary, and also commonly accepted practice, to normally provide fire-rated poke-through fittings and devices for conducting insulated conductors, wires, cables and the like for electrical power and telecommunication signals through holes or apertures which are formed in concrete building floors, and which electrical power and other kinds of signals, such as telecommunication signals, may be readily transmitted from a suitable source; for instance, a junction box located at or proximate one face of the concrete floor by means of the poke-through fitting through the aperture in the concrete building floor to a suitable outlet or service head which is located at the opposite face of the floor.

Hereby, in order to accomplish the foregoing purpose in positioning a feed-through fitting of the type described herein, and which has a poke-through fire barrier provided thereon within the aperture formed in the concrete floor, to be able to pass the insulated conductor or conductors through the fitting and fire barrier from one face of the floor to the other face of the floor, and to produce suitable connections in an electrical outlet or service head which is mounted over the aperture in the floor, generally the top face of the floor; the poke-through device may be equipped with gripping structure enabling the poke-through wiring device to be inserted from above into the floor aperture formed in the concrete floor and to resultingly anchor itself in a predetermined orientation in the aperture, while suspending a junction box below the floor aperture, as may be required. Consequently, the capability of being able to introduce the poke-through wiring device or fitting into the floor aperture from above and to enable it to be anchored in a predetermined oriented position in the aperture eliminates the need for cooperating electricians of working in tandem on the floors above and below the floor aperture in order to obtain an appropriately oriented installation of the poke-through fitting, thereby significantly reducing attendant labor costs.

2. Discussion of the Prior Art

In order to accomplish the foregoing; in essence, to provide the self-anchoring of the poke-through fittings or wiring devices or fitting it has heretofore been contemplated, in one specific instance, to compress fire-resistant discs, such as are made from an intumescent material, between two metal plates in a sandwich structure, and to thereby squeeze the intumescent discs so as to expand radially outwardly into contact with the perimeter of an aperture wall in a concrete floor to thereby securely retain the fittings therein. Although that type of structure imparts a self-anchoring feature to the fittings, it does not facilitate orienting the fittings in their extended angular positions so as to enable installing the wiring devices or poke-through fittings without the need for cooperating electricians working on opposite floors. Device of that type are described in Carroll, et al. U.S. Pat. No. 4,272,643.

An anchoring structure for poke-through wiring devices or fittings of the type considered herein is set forth in Shine U.S. Pat. No. 4,323,724, in which, fastened to a fire-retarding intumescent disc assembly, a split notched, ring-shaped resilient dished spring washer has anchoring surfaces adapted be wedged against the perimeter wall surface of a concrete floor aperture so as to securely anchor the entire poke-through wiring device or fitting therein in a predetermined angular orientation relative to the axis of the aperture. Although the fitting as elucidated in this patent publication imparts an essentially adequate self-anchoring feature to the poke-through fitting, in order to be able to remove the fitting from its installed position in the concrete floor aperture, this necessitates the entire fitting having to be forcibly pulled out, thereby practically either completely destroying or seriously damaging structural components thereof, necessitating expensive replacement thereof, in addition to entailing high labor costs in installing a new poke-through fitting. Moreover, the utilization of a resilient anchoring element, such as the dished spring washer, fails to secure the wiring fitting against upward displacement in the floor aperture, inasmuch as the anchoring force exerted outwardly against the wall surface of the floor aperture may be inadequate to ensure a permanent anchoring for the wiring fitting.

Another structure for the anchoring of a poke-through wiring device or fitting in a concrete floor aperture is described in Spencer U.S. Pat. No. 4,496,790, wherein a pair of substantially diametrically oppositely arranged resilient clips protrude beyond the diameter of a fire retarding plate-sandwich structure of a poke-through fitting on which they mounted by means of screw fasteners so as to contact, in a gripping manner, the perimeter of an aperture wall formed in a building floor which is constituted of a concrete material, thereby enabling the device to anchor itself in a predetermined angular orientation upon insertion therein, while facilitating removal and repositioning of the fitting through loosening of the screw fasteners and, resultingly, of the clips.

However, although the foregoing anchoring structure incorporating resilient clips improves upon the structure described in Shine U.S. Pat. No. 4,323,724 by enabling the clips to be removed through the loosening of the screw fasteners, and enabling the repositioning of the fitting subsequent to its being withdrawn from the floor aperture, the utilization of resilient clips which are of an essentially V-shaped configuration and in which the freely-flexible clip leg portion of the V-shape contacts the concrete wall fails to provide for an adequate gripping engagement with the wall of the concrete floor aperture, since the considerable flexibility and delicate nature inherent to this particular clip design does not allow for the exertion of a strong radial gripping force to be produced by this anchoring structure of the poke-through wiring device.

SUMMARY OF THE INVENTION

Accordingly, in order to obviate or ameliorate the drawbacks encountered in the prior art, and to concurrently render the self-anchoring structure of poke-through wiring devices or fittings simpler in function and structure, rather than employing the annular serrated, dished washer construction of the Shine U.S. Pat. No. 4,323,724, or the V-shaped resilient clips of the Spencer U.S. Pat. No. 4,496,790, the present invention contemplates the provision of anchoring clips in the shape of initially flat, essentially rectangular or polygonal rigid and non-resilient metal or steel plates which are securely fastened by means of screw fasteners in surface contact with at least one plate of a sandwich-type fire retardant disc structure, and with each of the clips projecting radially outwardly beyond the perimeter of the plate of the disc structure. Upon the insertion of the wiring fitting into a floor aperture of a concrete building floor, with such aperture being ordinarily formed from a preformed concrete tubular member having a precisely dimensioned aperture opening, the outer edge or at least the corner of each anchoring clip projecting beyond the perimeter of the fitting plate structure on which it is fastened, and with the anchoring clips collectively defining a perimetral or diametral outer dimension somewhat larger than the diameter of the floor aperture. Consequently, during the insertion of the wiring fitting, the radially outer portion of each anchoring clip plate will be bent backward from approximately the screw fastener thereof so as to be severely and permanently deformed in view of its non-resilient metal properties. Thus, the outer edge or corner of the backwardly bent or deformed portion of each anchoring clip plate firmly contacts and bitingly or grippingly engages the concrete wall surface of the floor aperture, inhibiting to withdrawal of the fitting from the floor aperture while concurrently causing the entire poke-through wiring device or fitting to be firmly anchored in the aperture in a predetermined angular orientation relative to the aperture axis as required by the specific installation. The employment of the initially flat and sturdy non-resiliently deformable metal plates constituting the anchoring clips ensures not only a rigid anchoring of the entire wiring device within the floor aperture upon deformation of the anchoring clip plates, but also allows for the use of inexpensive and simple structure in the shape of the initially flat clips, the latter which can be readily removed by simply loosening their mounting screws, thereby enabling the removal of the entire wiring device or fitting from the floor aperture in a simple manner, or enabling the repositioning thereof within the aperture by a single electrician and with only the use of a simple tool, such as a screwdriver or the like.

Alternatively, at times when the anchored wiring fitting is no longer required, rather than being removed from the floor aperture, the above-floor service fitting thereof is removed, inclusive of any wires or cables, and a flat abandonment plate is permanently installed over the remaining poke-through fitting or device and fastened to the floor. The anchoring clips or plates are preferably constituted from an inexpensive metal stamping; such as mild steel, and do not necessitate costly heat treatments, as would be the instance for resilient or spring steel anchoring components.

Accordingly, it is an object of the present invention to provide a simple and inexpensive self-anchoring structure for a poke-through wiring device or fitting which is insertable into an aperture formed in the concrete floor of a building structure.

It is a more specific object of the present invention to provide a self-anchoring poke-through wiring device of the type described herein, in which the anchoring engagement within the floor aperture is provided by flat metallic plate-like polygonal clips which are fastened to a fire retarding structure of the poke-through wiring device.

Yet another object of the present invention resides in the provision of an anchoring structure for the poke-through fitting of the type considered herein, wherein the anchoring action provided through the intermediary of simple flat non-resilient and permanently deformable metal plates, preferably metal stampings, which are mounted in surface contact with the fire retarding structure and which afford the simple mounting and anchoring of the entire poke-through wiring device within the concrete floor aperture of a building.

BRIEF DESCRIPTION OF THE DRAWINGS

The foregoing and other features and advantages of the inventive self-anchoring poke-through wiring device may now be more readily ascertained from the following detailed description of an exemplary embodiment thereof, taken in conjunction with the accompanying drawings; in which.

DETAILED DESCRIPTION

Figure 1:
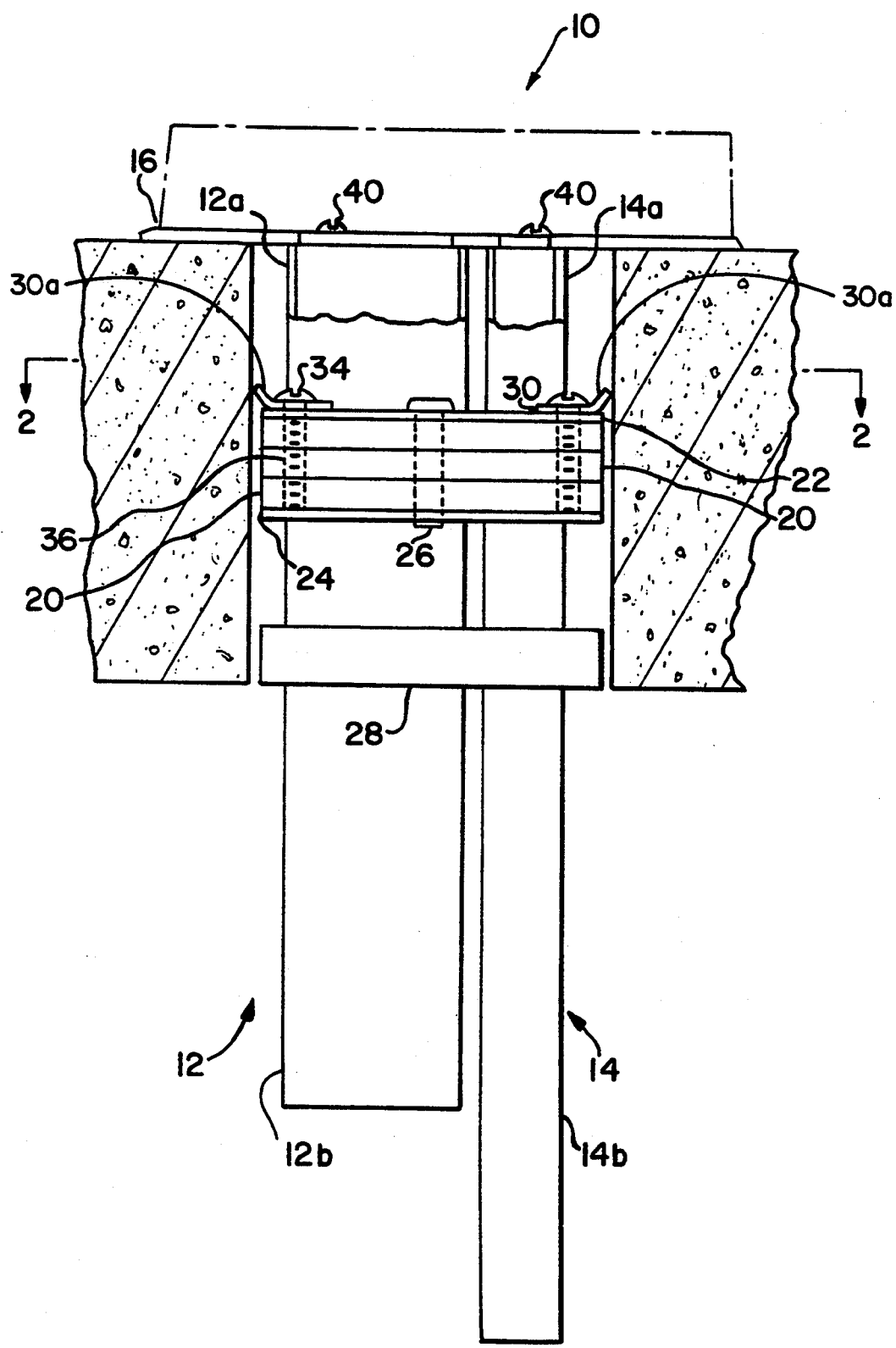
FIG. 1 illustrates a longitudinal, partially sectional view through a poke-through wiring device incorporating the anchoring clip structure pursuant to the present invention.

Referring now in detail to the drawings, and specifically FIG. 1, there is disclosed a typical poke-through wiring device 10 or fitting which is mountable so as to extend through a floor aperture formed in a concrete floor of a building structure, as is known in the technology. Hereby, the floor aperture may be of standard circular configuration, ordinarily constructed from a preformed tubular member having a precisely dimensioned aperture diameter; for instance, such as within the range of about 3 inches to $3\frac{1}{8}$ inches, and is adapted to receive tubular channels 12 and 14 of the fitting 10 for respectively conveying the insulated wiring and signal lines for electrical power and telecommunications equipment extending from one floor space to a superimposed upper floor space of a building structure, such channels 12 and 14 being primarily constructed from metallic tubing or conduits and the like, as is known in the building construction technology. The one end of the tubing structure or channel structure 12 and 14 is connected to a floor plate assembly 16 forming the bottom of a service head or power outlet (not shown) which is positionable on the upper face of the building floor, and of a size which is larger than that of the floor aperture extending downwardly through the concrete floor.

Within the floor aperture, along the extent of the poke-through wiring device 10, the tubular channels 12 and 14 are axially separated into respective upper and lower portions 12a, 12b; 14a, 14b by an interposed fire barrier arrangement 18 consisting of a plurality of superimposed intumescent circular disc members 20 (three shown), each having suitably dimensioned openings or knock-outs formed therein in alignment with the respective channels 12, 14, facilitating the passage therethrough of the electrical insulated conductors, wires, and/or other cables for electrical power and telecommunication signal transmission between the building floors. The intumescent-material disc members 20 are essentially sandwiched between a pair of disc-like circular metal plates 22 and 24, each having the contiguous ends of the respective channel portions 12a, 14a and 12b, 14b attached thereto, such as by welding or suitable fastening means. The interposed intumescent disc members 20 may be fastened to the plates 22 and 24 of the channel structure 12 and 14 through suitable through-extending screw fasteners 26 so as to form a unitary sandwich-type intumescent fire-retarding fire-rated barrier arrangement, as is well known in the modern building technology, and which will seal the floor aperture when the latter is exposed to heat and/or fire, as a result of the expansion of the intumescent disc members 20, causing the intumescent material to sealingly contact the wall of the aperture.

Moreover, a further lower fire barrier in the shape of a disc 28 of intumescent material may also be positioned spaced below the fire barrier arrangement 18 so as to have the lower portions 12b, 14b of the channels 12 and 14 extend therethrough.

Figure 2:
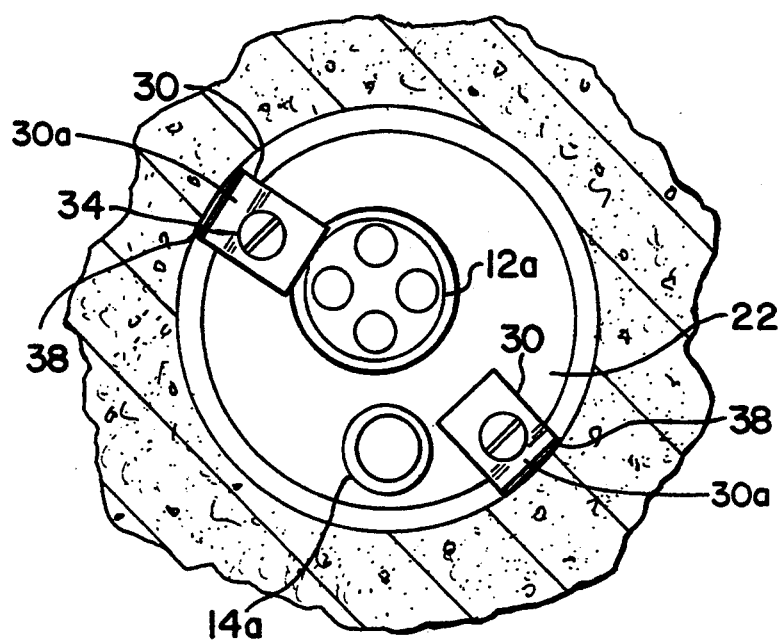
FIG. 2 illustrates a sectional view taken along line 2—2 in FIG. 1.
Figure 3:
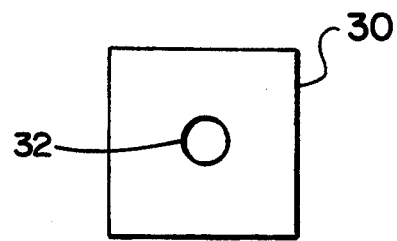
FIG. 3 illustrates a detail plan view of an anchoring clip for the poke-through wiring device pursuant to the invention.

In order to provide the inventive anchoring structure for the poke-through wiring device or fitting 10 within the concrete floor aperture, the present invention, as is more clearly ascertainable from FIGS. 2 and 3 of the drawings, provides for at least two anchoring clips 30 each consisting of an initially flat metal plate element, as shown in detail in FIG. 3 and as discussed in further detail hereinbelow, which are mounted at somewhat diametrically opposite locations on the end plate 22 for the channel portions 12a and 14a, with each plate element 30 shown as being of generally rectangular or square configuration, although it is readily apparent that other suitable polygonal or multi-sided external shapes, such as pentagons, hexagons, octagons, or even round, oval and similar suitable configurations would also be conceivably employable by the invention. Each of the plate elements 30 forming an anchoring clip is provided with a central hole 32 through which there may be inserted a suitable screw fastener 34 for threadingly engaging mating threaded bores 36 formed in the plate 22. The flat metal plate elements 30 are each fastened to be in fixedly immovable surface-contact with the plate 22 and only the outer edge portions 38 of the plate elements 30 protrude radially outwardly of the circumference or diameters of the plate 22 and disc members 18 to such an extent as to define a diametral measurement across the outermost or most distant points between the oppositely fastened anchoring clips or plate element 30 of approximately 3¼ to 3 5/16 inches; in essence, wider than the diameter of the floor aperture.

Consequently, upon the wiring fitting being inserted into the floor aperture and pushed downwardly so as to be seated therein in the desired position thereof, each of the anchoring plate elements 30 has the radially outer portion 30a extending from its screw fastener 34 bent upwardly opposite the direction of downward insertion for the wiring fitting, as is clearly illustrated in FIG. 1 of the drawings. In view of the non-resilient property of the metal plate members 30, each of the outer portions 30a is severely bent and permanently deformed relative to the remaining flat surface of the plate member 30, thereby causing a firm gripping and resulting anchoring action to be exerted by the outer edges of plate member portions 30a against the circumferential wall of the floor aperture. This will prevent the wiring fitting 10 from being dislocated or withdrawn from the floor aperture, while firmly anchoring the entire poke-through wiring device or fitting 10 in a predetermined angular orientation relative to the central axis of the floor aperture.

When it is desired to remove the wiring device 10 from or to reposition it within the floor aperture, it is merely necessary to remove bottom plate 16 of the service head at the upper face of the floor aperture by loosening and removing fasteners 40 which extend through and engage into threaded apertures in suitable plate positioning members, and to thereafter loosen the screw fasteners 34 to enable removal of the clips 30. This will eliminate the anchoring engagement of the wiring device 10 with the wall of the floor aperture, and enable it to be manipulated by a single person or electrician for suitable replacement and/or repositioning in the floor aperture, as desired. At other times, when the wiring fitting 10 is no longer required and is not to be replaced by another fitting, it may remain anchored in the floor aperture by means of the anchoring clips 30; while the service head and wiring is removed and thereafter an abandonment plate (not shown) is fastened on the floor above the fitting.

Preferably, although not necessarily, each of the anchoring clips 30 may be formed from a suitable stamping of a non-resilient high-strength metal, such as galvanized steel or the like, preferably annealed stainless steel Type 302 or 304, possessing a thickness of about 0.03 to 0.04 in., which does not require any heat treatment, and is capable of being bent and permanently severely deformed at the outwardly located edge of each clip as it is being pushed into the floor aperture so as to grippingly engage the peripheral wall surface thereof, thereby firmly clamping and anchoring the entire poke-through wiring device or fitting 10 in place within the aperture in a predetermined angular orientation. From the foregoing, it becomes readily apparent that the invention is directed to an extremely simple and inexpensive, yet novel and functionally highly efficient anchoring structure for poke-through wiring devices of the type considered herein.

While there has been shown and described what is considered to be a preferred embodiment of the invention, it will of course be understood that various modifications and changes in form or detail could readily be made without departing from the spirit of the invention. It is therefore intended that the invention not be limited to the exact form and detail herein shown and described, nor to anything less than the whole of the invention herein disclosed and as hereinafter claimed.

What is claimed is:

1. A self-anchoring poke-through wiring device for insertion into an aperture extending through a concrete slab floor of a building structure, said device facilitating electrical power and telecommunication signal transmission between a service head and a junction box located at opposite faces of the floor, said service head including a plate member positionable on the upper face of said floor so as to cover said aperture; channel means of said wiring device for conducting insulated wires and telecommunication signal through said floor aperture between said junction box and said service head, said channel means having upper and lower channel portions, said upper channel portion being fastened to and depending from said plate member into said aperture, fire retarding structure interposed between and fixedly connected to said upper and lower channel portions for sealing the aperture in response to encountered heat and fire to form a fire barrier in said floor aperture; and detachably fastened means mounted on said fire retarding structure for positioning said wiring device in said aperture and anchoring said device to the peripheral wall surface of said aperture in predetermined angular orientation relative to the axis thereof, said anchoring means comprising a plurality of discrete flat non-resilient, rigid metal plate elements each of polygonal shape and oriented so as to extend generally perpendicularly to the longitudinal axial direction of the wiring device prior to insertion of said wiring device into the aperture in said concrete floor slab, each said flat plate element having an edge or corner portion protruding radially outwardly of said fire retarding structure to an extent beyond the diameter of the floor aperture so as to, upon insertion into said aperture, cause the outer portions of each plate element be extensively and permanently bent upwardly and resultingly deformed for grippingly engaging the concrete wall surface of said floor aperture.

2. A poke-through wiring device as claimed in claim 1, wherein said fire retarding structure comprises a plurality of superimposed discs each consisting of an intumescent material; first and second metallic plate members having said intumescent discs fixedly positioned therebetween, said first and second metallic plate members being fastened to the continuous ends of respectively the upper and lower channel portions, at least said first metallic plate member having threaded bores formed therein proximate the circumferences thereof, each said clip-forming flat plate element having a central through hole; and screw fastener means being extendable through said central hole for threadingly engaging said aligned threaded bores and fixedly clamping said flat plate elements in surface-contacting engagement with said first metallic plate member.

3. A poke-through wiring device as claimed in claim 1, wherein each said flat plate element has a square shape.

4. A poke-through wiring device as claimed in claim 1, wherein two of said flat elements are mounted diametrically opposite each other on said first metallic plate member so as to radially protrude therefrom into gripping engagement with the peripheral wall of said floor aperture.

5. A poke-through wiring device as claimed in claim 1, wherein each said flat plate element consists of galvanized steel.

6. A poke-through wiring device as claimed in claim 1, wherein each said flat plate element consists of Type 302 or 304 annealed stainless steel.

7. A poke-through wiring device as claimed in claim 6, wherein each said flat plate element has a thickness of about 0.03 to 0.04 inches.

* * * * *